May 15, 1951  J. R. C. QUILTER  2,553,275
PARACHUTE HARNESS
Filed Feb. 17, 1949  4 Sheets-Sheet 1

INVENTOR
John R. C. Quilter
By Shoemaker & Mattare
Attorneys.

May 15, 1951  J. R. C. QUILTER  2,553,275
PARACHUTE HARNESS
Filed Feb. 17, 1949  4 Sheets-Sheet 2

INVENTOR
John R. C. Quilter
By Shoemaker & Mattare
Attorneys.

May 15, 1951     J. R. C. QUILTER     2,553,275
PARACHUTE HARNESS

Filed Feb. 17, 1949     4 Sheets-Sheet 3

INVENTOR
John R. C. Quilter
By Shoemaker & Mattau
Attorneys.

May 15, 1951  J. R. C. QUILTER  2,553,275
PARACHUTE HARNESS
Filed Feb. 17, 1949  4 Sheets-Sheet 4

INVENTOR
John R. C. Quilter
By Shoemaker & Mattare
Attorneys.

Patented May 15, 1951

2,553,275

UNITED STATES PATENT OFFICE 2,553,275

PARACHUTE HARNESS

John Raymond Cuthbert Quilter,
Woking, England

Application February 17, 1949, Serial No. 77,006
In Great Britain February 23, 1948

10 Claims. (Cl. 244—151)

1

This invention relates to parachute harness and more particularly to harness provided with means for attachment of two parachute packs.

The main object of the invention is to provide harness equipment suitable for example for military purposes, whereby a second or reserve parachute pack can be employed as a safeguard in case the first parachute fails to open when required, without, however, the unused second pack forming an encumbrance at the time of alighting by means of the first parachute in the normal manner.

Another object of the invention is to provide equipment of this character suitable either for harness comprising a quick-release device, such as the standard one employed upon harness provided with a single parachute pack, and including a control knob which is initially turned to unlock the mechanism and then pressed or struck to release the connected strap-ends of the harness, or to harness having no quick-release device, the strap-ends in front of the wearer being connected together in any desired manner, for example by conventional hooks and D-rings or shackles, as in certain types of harness used on trainer aeroplanes.

Accordingly the invention provides a disconnectible harness, having means for attachment of two parachute packs, and comprising one or more releasable hooks for the attachment of the second or reserve pack, the releasable hook or hooks being operated either from the quick-release device for the harness or working independently thereof when used with a conventional hook and D-ring harness.

A further object of the invention is to provide equipment of this character in which the second or reserve parachute pack is attached to the harness by two hooks, one of which is releasable either from a quick-release device on the harness or manually and independently of any such quick-release device, the other hook serving for the suspension of the reserve pack when its first hook has been released.

The invention also includes parachute harness provided with means for attachment of two parachute packs, and comprising a quick-release device on the harness, in combination with one or more releasable hooks for the attachment of the second or reserve pack, the releasable hook or one of the releasable hooks being freed automatically by the operation, or by an initial step in the operation, of the quick-release device. Thus the invention comprises in one form a quick-release device of the known kind for freeing a parachute harness but further provided with means for releasing also a reserve parachute pack normally carried on the chest of the wearer, said means being operated by an initial movement of the quick-release device.

Other objects and advantages of the invention will hereinafter appear from the following description, given with reference to the accompanying drawings, in which.

Figure 1:
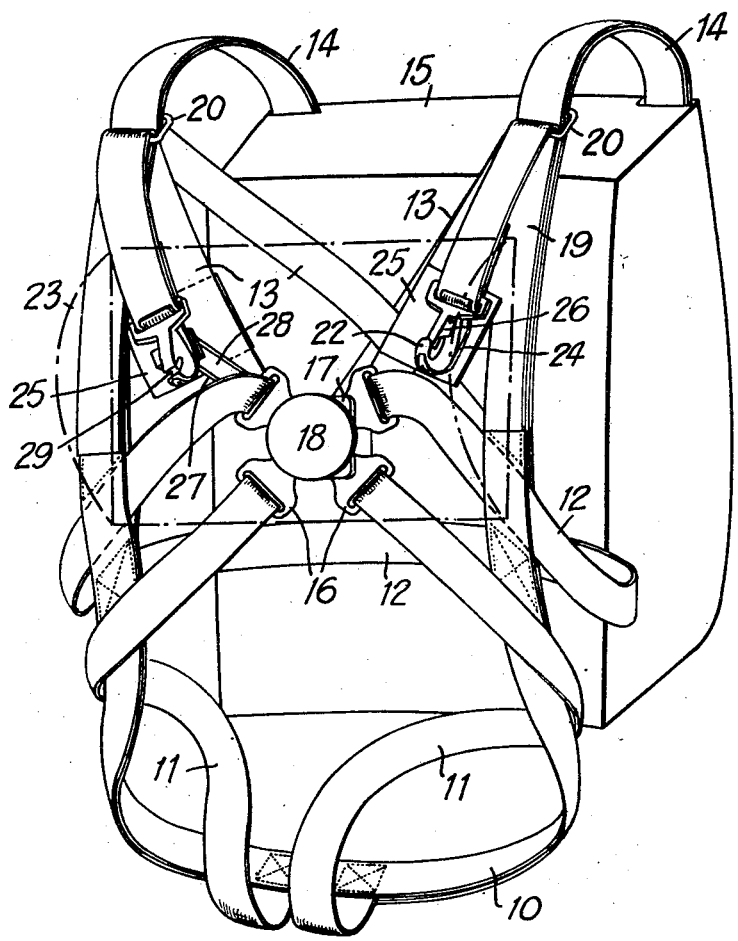
Fig. 1 represents a standard type of harness with a quick-release device, and also provided with hooks for the attachment of a chest-type reserve pack, the latter being indicated in chain lines.

Referring to Fig. 1, the harness shown is of well-known type, comprising a seat sling 10, leg straps 11, belt 12 and shoulder straps 13, the ends of the sling being secured to the lift webs 14 of the main parachute pack 15, and the ends of the leg straps, belt and shoulder straps being fitted with lugs 16 engaged by the quick-release device 17; the operation of the latter is controlled by a knob 18, which has to be turned to unlock the mechanism before it can be pressed to release the harness.

Front lift webs 19, also secured to the sling 10 and passing through the adjustable shoulder buckles 20, are provided at their free ends with hooks 21, 22 for the attachment of a second or reserve parachute pack, indicated at 23, which will normally rest upon the wearer's chest, the hooks being detachably held in clips 24 secured to back plates 25 riveted or otherwise mounted upon the front of the harness.

The hook 21 on the right-hand side is releasable automatically by the turning of the control knob 18, as hereinafter more fully explained; the other hook 22 may also be releasable in the same way, but is not so shown, its catch 26 being spring-controlled to engage with the shackle or other part of the pack 23 and this hook 22 being disengageable manually by depression of the spring catch.

The releasable hook 21 is shown mounted upon a support consisting of a spring leaf 27 secured to the base of the quick-release device 17; a sliding link or latch 28 moves along the spring leaf 27 under the effect of the part-rotation of the control knob 18 and thereby frees the front or chest-type parachute pack 23 from this hook 21 by raising a pawl 29 which normally closes over the shackle or like member of the attachment engaged with the hook. The sliding link or latch 28 may be composed of any suitable flexible material, being shown as a thin spring leaf, for example about three-quarters of the width of the supporting leaf 27, the flexibility of the two parts enabling them to adjust themselves upon the wearer's body so as to avoid discomfort.

Figure 2:
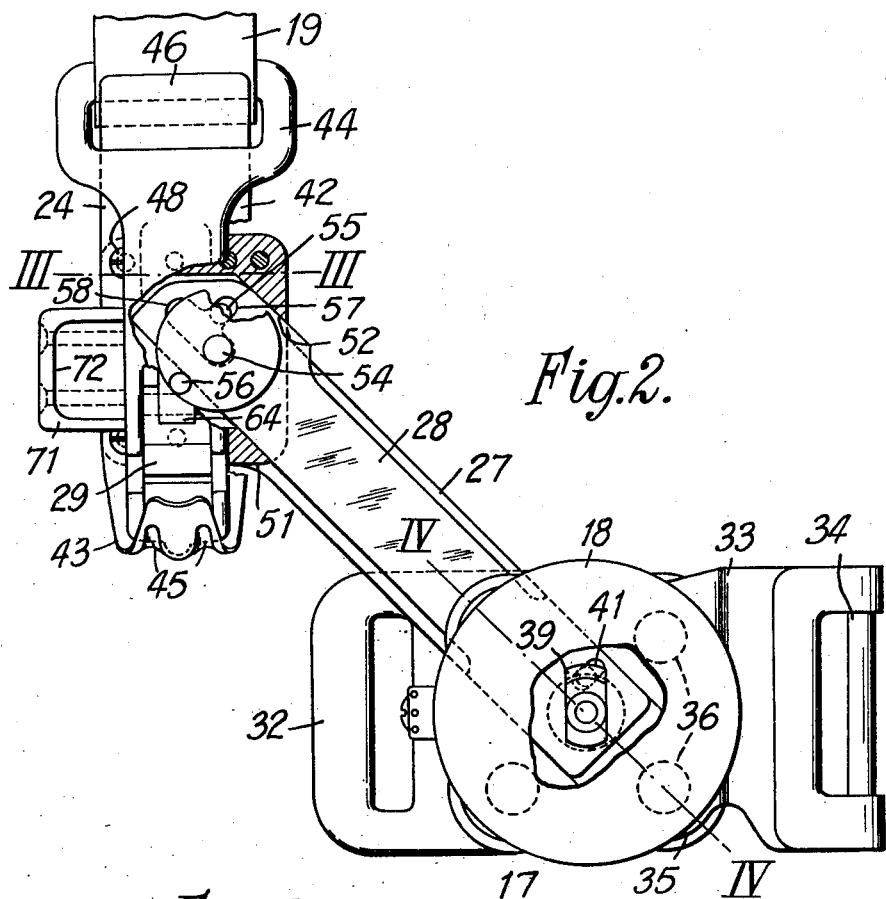
Fig. 2 is a front view of the quick-release device and right attachment hook seen in Fig. 1, shown on a larger scale and partly broken away.
Figure 3:
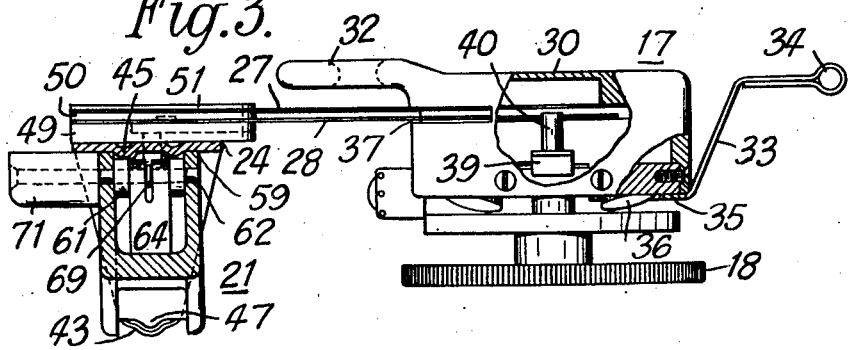
Fig. 3 is a plan view of Fig. 2, partly broken away, and partly in section on the line III—III of Fig. 2.
Figure 4:
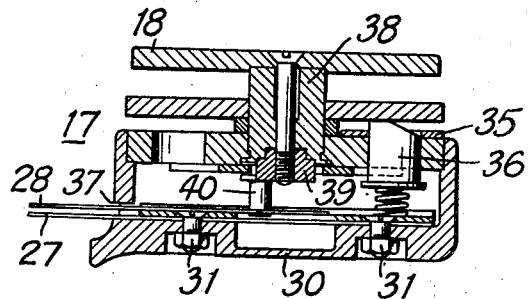
Fig. 4 is a section on the line IV—IV of Fig. 3.

As shown in detail in Figs. 2, 3 and 4, the hollow base 30 of the quick-release device is secured, as by screws 31, to one end of the spring leaf 27; it may have a laterally projecting portion 32 slotted transversely for connection to the waist belt 12 on one side. The quick-release device may have also a laterally projecting attachment member 33 for connection to the waist belt on the other side; this attachment member is shown in Figs. 2 and 3 as consisting of a cranked metal strip with a cross-pin 34 fixed near one end, the other end being formed with two eyes 35 which are releasably engaged by two of the locking studs 36 of the quick-release device, so that the two sides of the waist belt are disconnected when the harness is released by pressure upon the knob 18.

The wall of the base 30 is slotted at 37 towards its upper right-hand portion to admit the spring 27 and latch 28, the two leaves being spaced apart by the thickness of a washer plate or the like pressing the spring 27 against the back wall of the hollow base. The rotatable spindle 38 of the quick-release control knob 18 is fitted at its inner end with a rotatable member 39 having a crank pin or peg 40 projecting parallel to the spindle, this peg engaging in a transverse slot 41 in the latch 28, so that the turning of the control knob in the usual unlocking movement will cause the peg to slide this latch longitudinally in relation to the supporting leaf 27; the peg may be arranged to pass completely through the latch 28 but not to engage or rub upon the spring 27.

Figure 5:
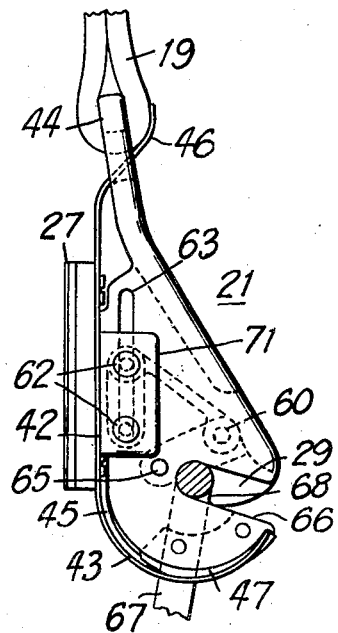
Fig. 5 is a side elevation of the attachment hook shown in Fig. 3.
Figure 6:
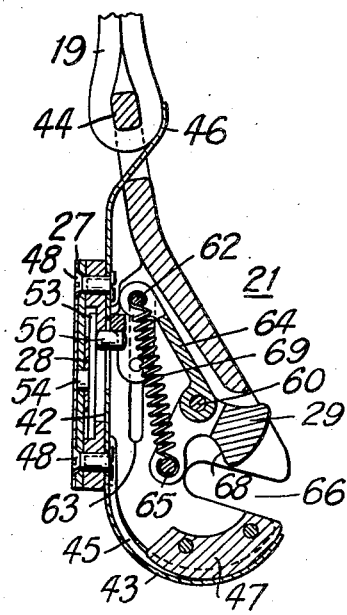
Fig. 6 is a similar view, in central section, with the pawl lifted.

The other end of the spring leaf 27 is arranged to support the releasable hook 21 by means of its clip 24, the two hooks 21, 22 being detachably supported so that they can pull away from their clips 24 when the parachute of the reserve pack 23 comes into operation, as customary with chest-type or observer's parachute packs mounted upon two hooks secured to front lift webs. Preferably each hook 21, 22 is detachably engaged in a spring clip 24 having a flat central portion 42 against which the body of the hook normally rests, as seen in Figs. 3 and 5, a bottom trough 43 in which the main jaw or curved lower end of the hook is seated, and a forwardly and upwardly bent upper portion adapted to engage the slotted shackle 44 through which the left web 19 is passed at the top of the hook. The flat central portion 42 of the clip and its bottom trough 43 may be formed with parallel ribs or flutings 45 to increase its stiffness, but the free extremity 46 (which may be narrowed to less width than the main portion 42) provides sufficient flexibility to allow the hook to be snapped into engagement in the trough 43 after its top end or shackle 44 has been placed over the forwardly bent top 46 of the clip; a peripheral rib 47 extending partly around the main jaw or curved lower end of the hook may be arranged to register with the groove or depression between the flutings 45 on the bottom trough of the clip, so as to guide the hook during its snap engagement.

In the case of the releasable hook 21, the flat central portion 42 of the clip is fixed by screws 48 to two substantially rectangular plates 49, 50; these screws pass through holes near the top and bottom edges of the plates 49, 50, and other holes near the side edges of the clip 24, lock nuts being fitted to the ends of the screws in front of the clip. The box or housing thus assembled is secured to an obliquely-set head portion 51 of the leaf spring 27 by similar screws passed through other holes near the top and bottom edges of the plates 49, 50 and of the head portion 51, and through the back plate 25, lock nuts being fitted behind the latter. The foremost plate 49, which is thicker than the next plate 50, is recessed on its rear face to provide an oblique slideway 52 for the latch 28, which is thus spaced from the spring support 27 at this end by the thickness of the plate 50; the same recess also accommodates a disc 53 journaled upon short stubs 54 rotatable in aligned holes in the two plates 49, 50. This disc 53 carries two crank pins 55, 56 upon its opposite faces, set at approximately 135 degrees apart, one pin 55 being relatively short and working in the lateral branch 57 of a T-shaped slot in the latch 28, the main portion 58 of this slot having clearance for the adjacent stub 54, and the other pin 56 being long enough to pass through the foremost plate 49 and clip portion 42, as by way of part-circular slots therein, and to project for a short distance (for example a quarter of an inch) in front of the clip.

The back of the hook 21, when engaged in the clip, rests against the flat central portion 42 of the latter, its sides being formed with two parallel facings 59 which fit outside the ribs or flutings 45 on the portion 42 of the clip so as to locate the parts in relation to one another. The projecting crank pin 56 of the rotatable disc 53 extends into the body of the hook between these facings and engages beneath a spring-controlled carriage 61 guided by transverse pins 62 thereon working in slots 63 near the rear edges of the body sides, that is, in a substantially vertical direction; from the upper pin 62, an oblique link 64 extends in a forward and downward direction to another pin 60 near the front end of the pawl 29 which is pivoted upon a cross pin 65 inside the body of the hook, near the inner end of the slots 66 forming the hook opening or jaws for the shackle or other pack attachment member 67, the pawl 29 being so shaped on its lower face as to provide a hooked portion 68 engaging over the said shackle or equivalent member, as shown in Fig. 5. The spring 69 controlling the carriage 61 may be connected between the upper pin 62 of the latter and the cross pin 65 on which the pawl 29 is pivoted.

Since the spring-controlled carriage 61 can rise without being lifted by the crank pin 56 engaged beneath it, the parachute pack 23 can be attached to the harness in the normal manner by forcing the shackle or equivalent member 67 into the slots or jaws 66 of the releasable hook, after the corresponding shackle on the other side of the pack has been engaged with the hook 22 on that side of the harness. In the case of this hook 22, which in the arrangement shown in Fig. 1 is not releasable by the operation of the quick-release device, it may be fitted with any suitable kind of manual release alternative to the depression of its catch 26, the supporting clip 24 being fixed upon the backing plate 25 which may be stitched or riveted to the front web 19 on that side of the harness. A manual release of the hook 21 is also provided by means of a sliding thumb-piece 71 attached to the spring-controlled carriage 61, for example by extending the pins 62 through the top and bottom of the thumb-piece, which is recessed at 72 in order to facilitate its grip by the wearer; by lifting the thumb-piece 71 and the carriage with the thumb of one hand which at the same time grips the shackle or equivalent member of the reserve parachute pack 23, the latter can be released manually from the harness, the pack 23 then swinging down on its other shackle still engaged by the hook 22.

Automatic disengagement of the shackle engaged in the releasable hook 21 takes place when the control knob 18 of the quick-release device is turned for unlocking the mechanism as the initial step in freeing the wearer from his harness, the part-rotation of the peg-fitted member 39 causing the latch 28 to slide longitudinally in relation to the spring support 27, and this longitudinal movement being converted by the crank-pins 55, 56 of the rotatable disc 53 behind the hook 21 into an upward movement of the carriage 61 inside the latter, whereby the retaining pawl 29 is lifted by the oblique link 64 so as to free the shackle or equivalent member 67. Subsequent pressure on the control knob 18 will release the straps connected to the quick-release device, so that the harness will be completely released, the front or reserve pack 23 remaining attached to the harness by one shackle engaged with the hook 22 on that side, but swinging clear of the wearer due to its one-sided release at the initial turning movement of the control knob 18.

In the event of a long flight in a transport aeroplane, for example, the wearer may desire to remove the front pack 23, without freeing himself from the harness, in which case part-rotation of the control knob 18 without subsequent pressure will suffice to disengage one shackle of the front pack from the releasable hook 21, after which he can return the control knob 18 to locked position and disengage the other shackle from the hook 22 on that side; both hooks 21, 22 will remain in position, ready for the re-attachment of the front pack 23, if desired at a later time. Similarly, if the wearer desires to remove the front pack 23 before freeing himself from the harness, as in the case of a normal descent by means of the parachute released from the rear pack 15, when the presence of the front pack is likely to cause difficulty or even injury to the wearer in alighting upon the ground, the control knob 18 can be given its initial part-rotation at any time after the rear-pack parachute has deployed, so that the wearer can jettison the unopened front pack before nearing the ground. This facility is particularly advantageous in the connection with parachute drops by "paratroopers" and other combatants, for whom the provision of a second parachute for use in the event of the first one failing to open, is most desirable, but has hitherto been open to objection or even impracticable owing to the additional encumbrance involved.

As mentioned above, two releasable hooks such as 21 may be provided for the attachment of the second or reserve parachute pack 23; in that case, the first or supporting spring 27 and the latch or second spring 28 may be extended to both sides of the quick-release device 17, for example in opposite and horizontal directions, the initial part-rotation of the peg-fitted disc 39 causing the latch 28 to slide longitudinally of the extended support, and the two ends of the latch operating crank-fitted discs such as 53 behind the respective releasable hooks 21, 22, so as to lift both retaining pawls in the manner already described for the single releasable hook.

It will be noted that the two leaf or flat springs 27, 28, being spaced apart throughout their length, are not only quite flexible to permit the wearer's movements without causing him discomfort, but can bend without producing relative sliding motion of the latch 28, the leaf on the outside of the curve so produced being able to remain more nearly straight than the leaf on the inside of the curve, and thus neutralizing the difference of radius which might produce relative motion at one end.

Figure 7:
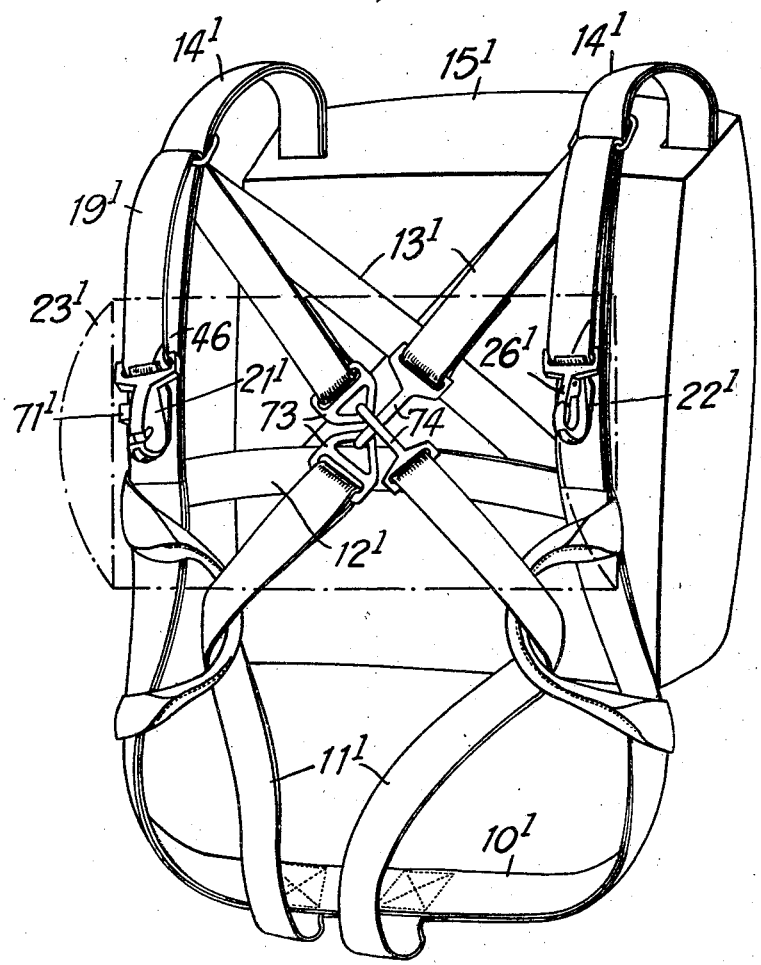
Fig. 7 represents a trainer-type harness with a conventional hook and D-ring connection, also provided with hooks for the attachment of a reserve pack indicated in chain lines.

Fig. 7 shows another type of parachute harness, in which a seat sling 10' is secured to the main lift webs 14' and front lift webs 19', and the leg straps 11' pass through loops formed by the ends of the belt 12', the ends of these leg straps and those of the shoulder straps 13' being connected in front of the wearer by conventional D-rings or shackles 73 and hooks 74; the main parachute pack 15' is carried at the back and the reserve pack 23' at the front, this reserve pack having its shackles or equivalent members engaged upon two attachment hooks 21', 22', detachably clipped to the harness and secured to the front lift webs 19'. The right-hand hook 21' is of the same releasable type and construction as already described with reference to Figs. 2, 3, 5 and 6, adapted for operation by means of a thumb-piece 71', but without the automatic operating means such as the sliding latch 28, peg-fitted disc 39 and crank-fitted disc 53. The left-hand hook 22' may be any standard form of snap-hook, with a manually releasable catch 26' as shown in Fig. 1, or it may be of the same type and construction as the right-hand hook 21', provided with a thumb-piece similar to the part 71'.

In this form of the invention, it is possible to release the right-hand hook 21' manually at any time, allowing the front or reserve pack 23' to swing down upon its attachment to the other hook 22', for example after the main parachute has opened and while the wearer is preparing to alight, so that he may have unimpeded access to the D-rings and hooks for discarding the harness at the moment when he reaches the ground.

It will be obvious that the invention may be applied in this form to a parachute harness provided with the quick-release device such as that described with reference to Fig. 1, but without any sliding latch connection between the quick-release device and the releasable hook for the reserve pack.

What I claim is:

1. In a parachute harness provided with main and reserve packs, means for releasable attachment of the reserve pack comprising two hooks, spring clips detachably holding said reserve pack to the harness, and means associated with one of said spring clips for voluntary release of said reserve pack from the respective hook, said voluntary release means including a member slidable in relation to said one spring clip.

2. In a parachute harness provided with main and reserve packs, means for releasable attachment of the reserve pack comprising two hooks, spring clips detachably holding said reserve pack to the harness, and means associated with one of said spring clips for voluntary release of said reserve pack from the respective hook, said voluntary release means comprising a thumb-piece slidably guided upon said hook, a spring-controlled carriage inside said hook, and a pawl normally maintaining said reserve pack engaged with said hook, said pawl being lifted to disengage said reserve pack from said hook by manual operation of said thumb-piece.

3. In a parachute harness provided with main and reserve packs and a quick-release device for removal of the harness, means for releasable attachment of the reserve pack comprising two hooks, spring clips detachably holding said hooks to the harness, and means for voluntary release of said reserve pack from one of said hooks, said voluntary release means including a member slidable in relation to the respective spring clip and operable through manipulation of said quick-release device.

4. In a parachute harness provided with main and reserve packs and a quick-release device for removal of the harness, means for releasable attachment of the reserve pack comprising two hooks, spring clips detachably holding said hooks to the harness, and means for voluntary release of said reserve pack from one of said hooks, said voluntary release means including a latch slidable in relation to the respective spring clip, said latch being operable through manipulation of said quick-release device and also operable independently of said quick-release device.

5. In a parachute harness provided with main and reserve packs and a quick-release device for removal of the harness, means for releasable attachment of the reserve pack comprising two hooks, a member secured to said quick-release device and extending behind one of said hooks, a latch slidable in relation to said member by manipulation of said quick-release device, and mechanism arranged between said one hook and the adjacent portion of said member, said mechanism including a crank disc rotatable by sliding movement of said latch and operative to release said one hook.

6. In a parachute harness provided with a main pack, means for releasable attachment of a reserve pack and means for release of said harness, reserve-pack attachment means comprising two hooks detachably mounted upon said harness, each of said hooks being adapted for snap-engagement by a shackle upon said reserve pack, and one of said hooks having manual means for disengaging the respective shackle, said manual means comprising a slidable member external to said one hook, a slidable spring-controlled carriage within said one hook, a pawl normally locking said shackle to said hook, and a link from said carriage to said pawl, the operation of said slidable member causing said carriage to displace said link and thereby free said pawl from said shackle.

7. In a parachute harness provided with main and reserve packs and a quick-release device for removal of the harness, means for releasable attachment of the reserve pack comprising two hooks engageable by snap-action with elements of said reserve pack, spring clips detachably holding said hooks to the harness, and means for voluntary release of said reserve pack from one of said hooks, said voluntary release including a latch slidable in relation to the respective spring clip and being operable through manipulation of said quick-release device, and said reserve pack then remaining suspended from the other of said hooks for removal together with the harness upon final operation of said quick-release device.

8. In a parachute harness provided with main and reserve packs and a quick-release device for removal of the harness, means for releasable attachment of the reserve pack comprising two hooks engageable by snap-action with elements of said reserve pack, spring clips detachably holding said hooks to the harness, and means for voluntary release of said reserve pack from one of said hooks, said voluntary means including a latch slidable in relation to the respective spring clip, said latch being operable through manipulation of said quick-release device and also operable independently of said quick-release device, and said reserve pack then remaining suspended from the other of said hooks for removal together with the harness upon final operation of said quick-release device.

9. In a parachute harness provided with main and reserve packs and a quick-release device for removal of the harness, means for releasable attachment of the reserve pack comprising two hooks, spring clips detachably holding said hooks to the harness, a spring leaf member secured to said quick-release device and to one of said clips, a flexible link slidable longitudinally of said spring leaf member by manipulation of said quick-release device, and mechanism for releasing the hook held in said one clip by sliding movement of said flexible link.

10. In a parachute harness provided with main and reserve packs and a quick-release device for removal of the harness, means for releasable attachment of the reserve pack comprising two hooks, spring clips detachably holding said hooks to the harness, and means for voluntary release of said reserve pack from one of said hooks, said voluntary release means including a link slidable in relation to the respective spring clip and to said quick-release device, said slidable link being operable through manipulation of said said quick-release device, and a manual over-ride control for releasing said reserve pack from said one hook independently of said link, said reserve pack when released remaining suspended from the other of said hooks for removal together with the harness.

JOHN RAYMOND CUTHBERT QUILTER.

REFERENCES CITED

The following references are of record in the file of this patent:

UNITED STATES PATENTS

| Number | Name | Date |
|---|---|---|
| 2,016,236 | Irvin | Oct. 1, 1935 |
| 2,164,130 | Waite | June 27, 1939 |
| 2,402,264 | Smith | June 18, 1946 |
| 2,439,613 | Quilter | Apr. 13, 1948 |
| 2,447,824 | Tauty | Aug. 24, 1948 |
| 2,467,037 | Kajdan | Apr. 12, 1949 |